(12) United States Patent
Manolakos et al.

(10) Patent No.: US 11,057,917 B2
(45) Date of Patent: Jul. 6, 2021

(54) QUASI CO-LOCATION RELATION CONFIGURATION FOR PERIODIC CHANNEL STATE INFORMATION REFERENCE SIGNALS

(71) Applicant: QUALCOMM Incorporated, San Diego, CA (US)

(72) Inventors: Alexandros Manolakos, San Diego, CA (US); Parisa Cheraghi, San Diego, CA (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 49 days.

(21) Appl. No.: 16/677,259

(22) Filed: Nov. 7, 2019

(65) Prior Publication Data

US 2020/0154465 A1 May 14, 2020

(30) Foreign Application Priority Data

Nov. 12, 2018 (GR) .............................. 20180100517

(51) Int. Cl.
*H04W 72/12* (2009.01)
*H04L 5/00* (2006.01)
*H04W 72/14* (2009.01)
*H04W 84/04* (2009.01)

(52) U.S. Cl.
CPC ....... *H04W 72/1273* (2013.01); *H04L 5/0051* (2013.01); *H04W 72/1289* (2013.01); *H04W 72/14* (2013.01); *H04W 84/045* (2013.01)

(58) Field of Classification Search
None
See application file for complete search history.

(56) References Cited

U.S. PATENT DOCUMENTS

| 2013/0279437 | A1* | 10/2013 | Ng | H04L 25/0224 370/329 |
| 2015/0029966 | A1* | 1/2015 | Park | H04L 5/0053 370/329 |
| 2015/0215905 | A1* | 7/2015 | Park | H04W 76/00 370/329 |

(Continued)

OTHER PUBLICATIONS

International Search Report and Written Opinion—PCT/US2019/060468—ISA/EPO—dated Apr. 28, 2020.

(Continued)

*Primary Examiner* — Andrew C Oh
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive information configuring one or more occasions of a periodic channel state information reference signal (P-CSI-RS) without associated quasi co-location (QCL) information for the one or more occasions of the P-CSI-RS. The UE may receive an occasion of the P-CSI-RS, of the one or more occasions of the P-CSI-RS, using a QCL relation determined based at least in part on whether a physical downlink shared channel (PDSCH) is scheduled for a same set of symbols as the occasion of the P-CSI-RS. Numerous other aspects are provided.

30 Claims, 11 Drawing Sheets

(56) References Cited

U.S. PATENT DOCUMENTS

| | | | | |
|---|---|---|---|---|
| 2016/0142189 | A1* | 5/2016 | Shin | H04L 5/0048 370/329 |
| 2016/0233986 | A1* | 8/2016 | Lee | H04W 72/1273 |
| 2016/0309466 | A1* | 10/2016 | Chen | H04W 72/1278 |
| 2016/0344524 | A1* | 11/2016 | Kim | H04L 5/0048 |
| 2017/0202014 | A1* | 7/2017 | Moon | H04L 5/005 |
| 2017/0289831 | A1* | 10/2017 | Park | G01S 5/0236 |
| 2018/0219606 | A1* | 8/2018 | Ng | H04L 5/0053 |
| 2018/0317121 | A1* | 11/2018 | Liao | H04L 45/38 |
| 2018/0332520 | A1* | 11/2018 | Cheng | H04W 36/0016 |
| 2018/0343653 | A1* | 11/2018 | Guo | H04L 5/0053 |
| 2018/0368035 | A1* | 12/2018 | Huang | H04W 72/042 |
| 2019/0037429 | A1* | 1/2019 | Davydov | H04L 5/0035 |
| 2019/0037495 | A1* | 1/2019 | John Wilson | H04B 7/0695 |
| 2019/0069285 | A1* | 2/2019 | Chandrasekhar | H04B 7/0695 |
| 2019/0103951 | A1* | 4/2019 | Park | H04L 1/0061 |
| 2019/0238211 | A1* | 8/2019 | Enescu | H04B 7/0695 |
| 2019/0280803 | A1* | 9/2019 | Muruganathan | H04L 5/005 |
| 2019/0349915 | A1* | 11/2019 | Ahn | H04B 7/0695 |
| 2019/0387501 | A1* | 12/2019 | Park | H04L 5/005 |
| 2020/0036555 | A1* | 1/2020 | Davydov | H04L 5/0094 |
| 2020/0112355 | A1* | 4/2020 | Park | H04B 7/0626 |
| 2020/0120683 | A1* | 4/2020 | Kakishima | H04W 72/082 |
| 2020/0178338 | A1* | 6/2020 | Ahn | H04B 7/0695 |
| 2020/0195324 | A1* | 6/2020 | Grant | H04W 24/10 |
| 2020/0196161 | A1* | 6/2020 | Ahn | H04W 80/08 |
| 2020/0252951 | A1* | 8/2020 | Frenne | H04B 7/0617 |
| 2020/0280409 | A1* | 9/2020 | Grant | H04L 5/0044 |

OTHER PUBLICATIONS

Nokia, et al., "Feature Lead Summary on QCL", 3GPP Draft, R1-1813980, Feature Lead Summary on QCL V1, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 13, 2018 (Nov. 13, 2018), XP051480167, 12 pages, Retrieved from the Internet: URL: http://www.3gpp.org/ftp/tsg%5Fran/WG1%5FRL1/TSGR1%5F95/Docs/R1%2D1813980%2Ezip. [retrieved on Nov. 13, 2018] the whole document.

QUALCOMM Incorporated: "Maintenance on Reference Signals and QCL", 3GPP Draft, 3GPP TSG RAN WG1 Meeting #95, R1-1813397, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 3, 2018 (Nov. 3, 2018), XP051479716, 5 pages, Retrieved from the Internet: URL: http://www.3gpp.org/ftp/tsg%5Fran/WG1%5FRL1/TSGR1%5F95/Docs/R1%2D1813397%2Ezip. [retrieved on Nov. 3, 2018] Sections 7. 8.

* cited by examiner

QUASI CO-LOCATION RELATION CONFIGURATION FOR PERIODIC CHANNEL STATE INFORMATION REFERENCE SIGNALS

CROSS-REFERENCE TO RELATED APPLICATION

This application claims priority to Greek Patent Application No. 20180100517, filed on Nov. 12, 2018, entitled "QUASI CO-LOCATION RELATION CONFIGURATION FOR PERIODIC CHANNEL STATE INFORMATION REFERENCE SIGNALS," which is hereby expressly incorporated by reference herein.

FIELD OF THE DISCLOSURE

Aspects of the present disclosure generally relate to wireless communication, and to techniques and apparatuses for quasi co-location relation configuration for periodic channel state information (CSI) reference signals (RS) (P-CSI-RSs).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, further improvements in LTE and NR technologies remain useful. Preferably, these improvements should be applicable to other multiple access technologies and the telecommunication standards that employ these technologies.

SUMMARY

In some aspects, a method of wireless communication, performed by a user equipment (UE), may include receiving information configuring one or more occasions of a periodic channel state information reference signal (P-CSI-RS) without associated quasi co-location (QCL) information for the one or more occasions of the P-CSI-RS. The method may include receiving an occasion of the P-CSI-RS, of the one or more occasions of the P-CSI-RS, using a QCL relation determined based at least in part on whether a physical downlink shared channel (PDSCH) is scheduled for a same set of symbols as the occasion of the P-CSI-RS.

In some aspects, a UE for wireless communication may include memory and one or more processors operatively coupled to the memory. The memory and the one or more processors may be configured to receive information configuring one or more occasions of a periodic channel state information reference signal (P-CSI-RS) without associated quasi co-location (QCL) information for the one or more occasions of the P-CSI-RS. The memory and the one or more processors may be configured to receive an occasion of the P-CSI-RS, of the one or more occasions of the P-CSI-RS, using a QCL relation determined based at least in part on whether a physical downlink shared channel (PDSCH) is scheduled for a same set of symbols as the occasion of the P-CSI-RS.

In some aspects, a non-transitory computer-readable medium may store one or more instructions for wireless communication. The one or more instructions, when executed by one or more processors of a UE, may cause the one or more processors to receive information configuring one or more occasions of a periodic channel state information reference signal (P-CSI-RS) without associated quasi co-location (QCL) information for the one or more occasions of the P-CSI-RS. The one or more instructions, when executed by the one or more processors of the UE, may cause the one or more processors to receive an occasion of the P-CSI-RS, of the one or more occasions of the P-CSI-RS, using a QCL relation determined based at least in part on whether a physical downlink shared channel (PDSCH) is scheduled for a same set of symbols as the occasion of the P-CSI-RS.

In some aspects, an apparatus for wireless communication may include means for receiving information configuring one or more occasions of a periodic channel state information reference signal (P-CSI-RS) without associated quasi co-location (QCL) information for the one or more occasions of the P-CSI-RS. The apparatus may include means for receiving an occasion of the P-CSI-RS, of the one or more occasions of the P-CSI-RS, using a QCL relation determined based at least in part on whether a physical downlink shared channel (PDSCH) is scheduled for a same set of symbols as the occasion of the P-CSI-RS.

Aspects generally include a method, apparatus, system, computer program product, non-transitory computer-readable medium, user equipment, base station, wireless communication device, and processing system as substantially described herein with reference to and as illustrated by the accompanying drawings and/or specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
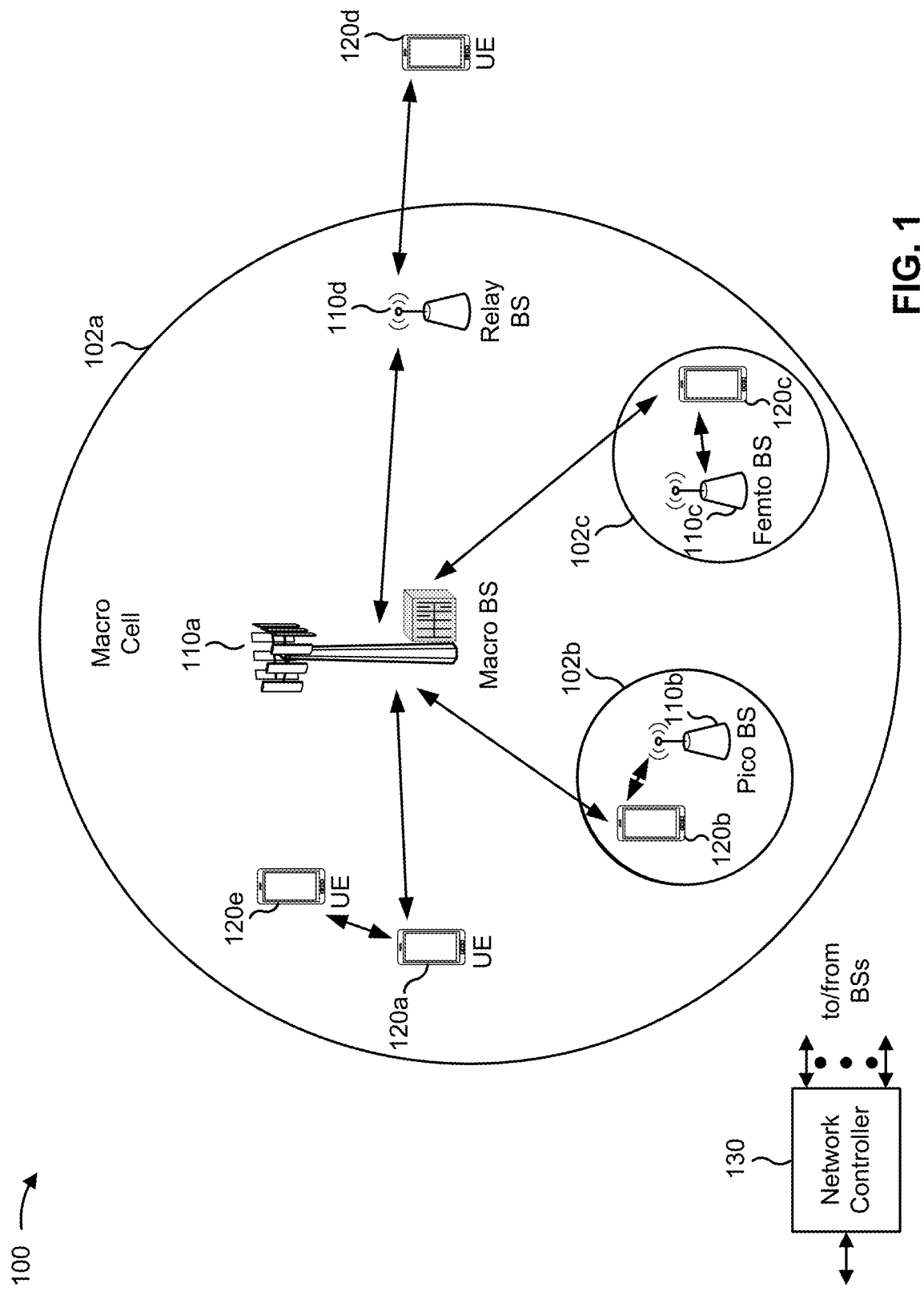
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. Wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
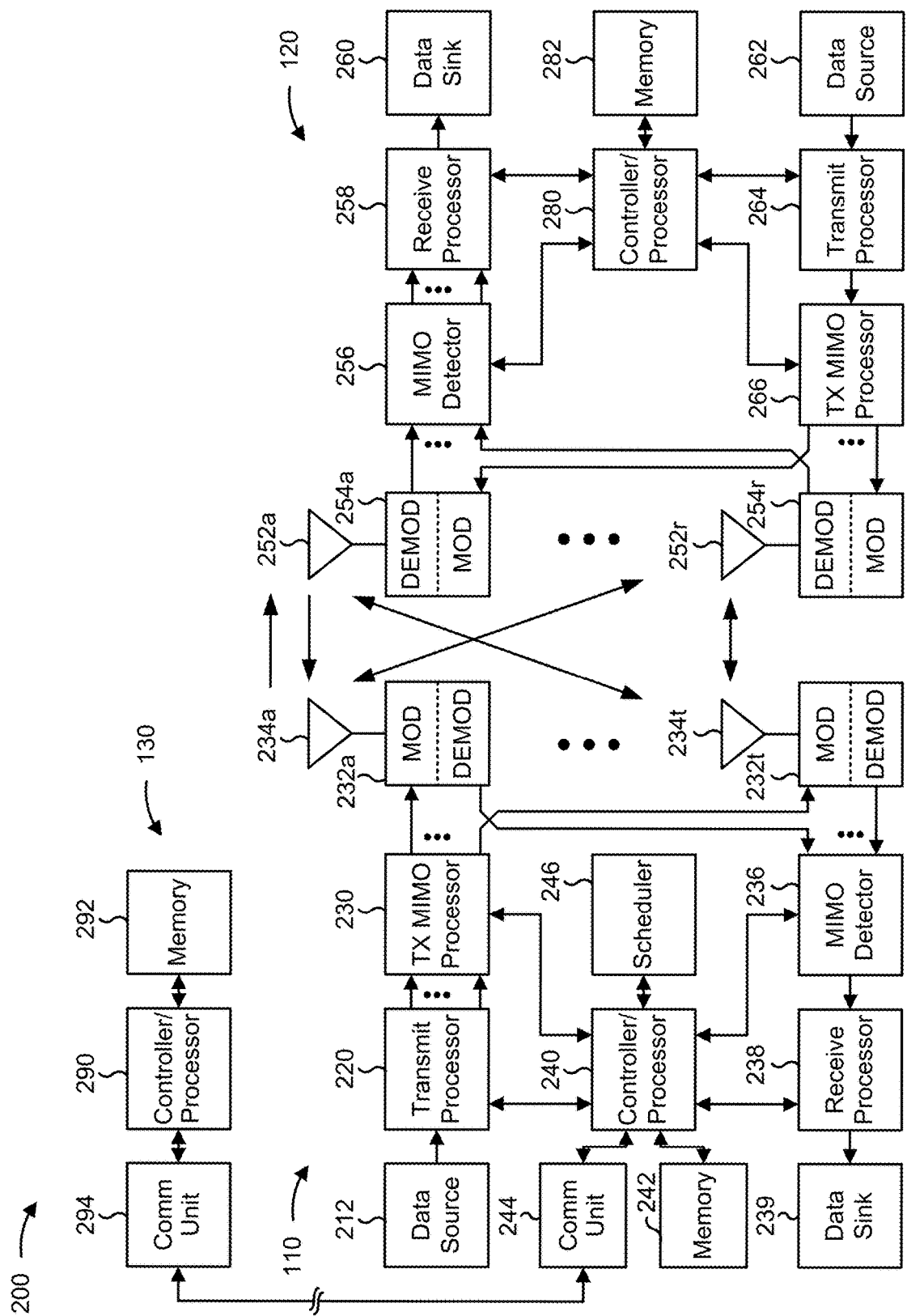
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with QCL relation configuration for P-CSI-RSs, as described in more detail elsewhere herein. For example, controller/processor 240 of base station 110, controller/processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. As such, memory 282 of the UE can comprise a non-transitory computer-readable medium storing one or more instructions for wireless communication, where the one or more instructions comprise one or more instructions that, when executed by one or more processors (e.g., processor 258 and/or controller/processor 280) of the UE 120, cause the one or more processors to perform the method described in greater detail with reference to FIGS. 7A, 7B, 7C, and/or 8. A scheduler 246 may schedule UEs for data transmission on the downlink and/or uplink.

In some aspects, UE 120 may include means for receiving information configuring one or more occasions of a periodic channel state information reference signal (P-CSI-RS) without associated quasi co-location (QCL) information for the one or more occasions of the P-CSI-RS (e.g., using antenna 252, DEMOD 254, MIMO detector 256, receive processor 258, controller/processor 280, memory 282, and/or the like), means for receiving an occasion of the P-CSI-RS, of the one or more occasions of the P-CSI-RS, using a QCL relation determined based at least in part on whether a physical downlink shared channel (PDSCH) is scheduled for a same set of symbols as the occasion of the P-CSI-RS (e.g., using antenna 252, DEMOD 254, MIMO detector 256, receive processor 258, controller/processor 280, memory 282, and/or the like), and/or the like. In some aspects, such means may include one or more components of UE 120 described in connection with FIG. 2.

As indicated above, FIG. 2 is provided merely as an example. Other examples may differ from what is described with regard to FIG. 2.

Figure 3A:
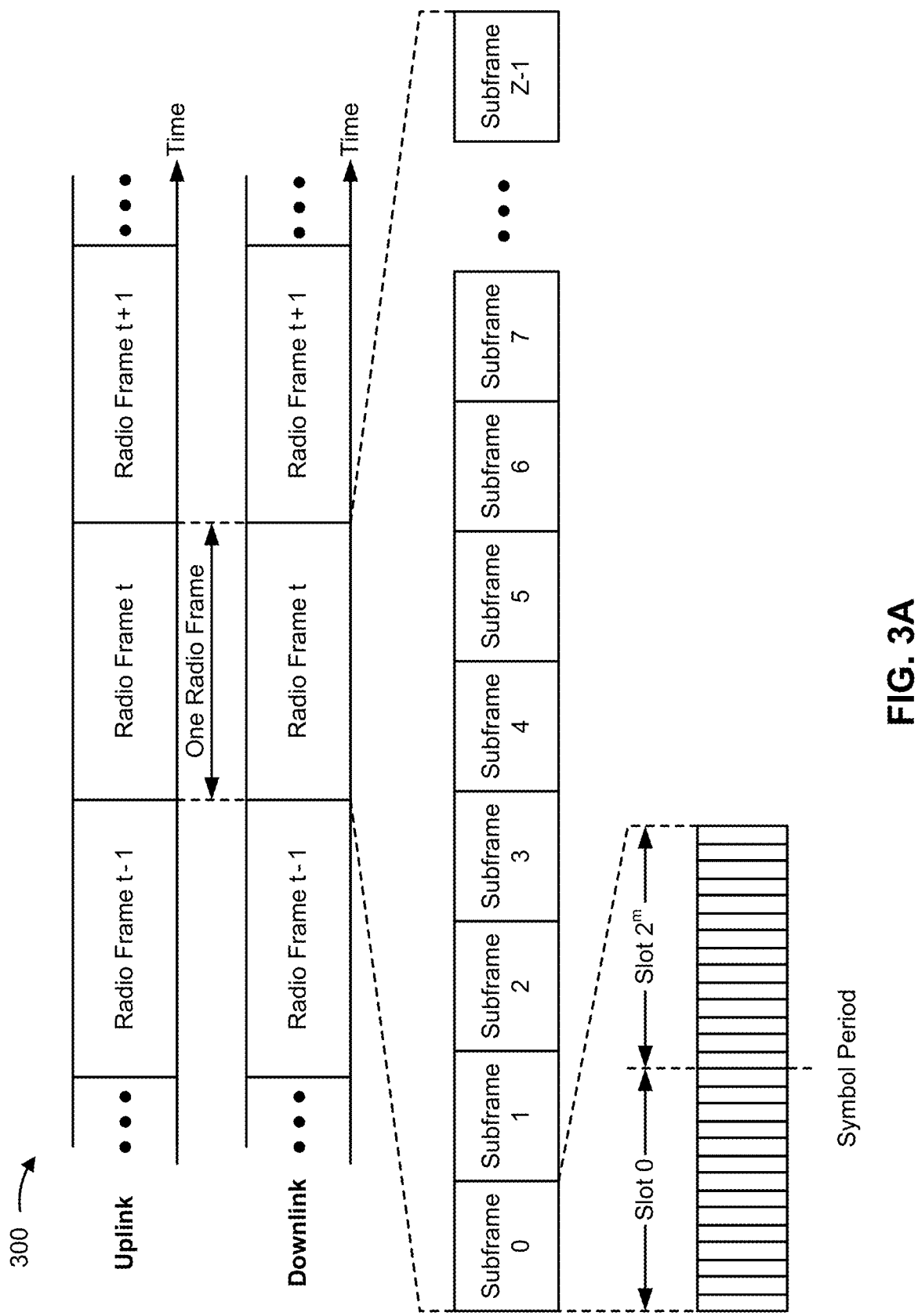
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
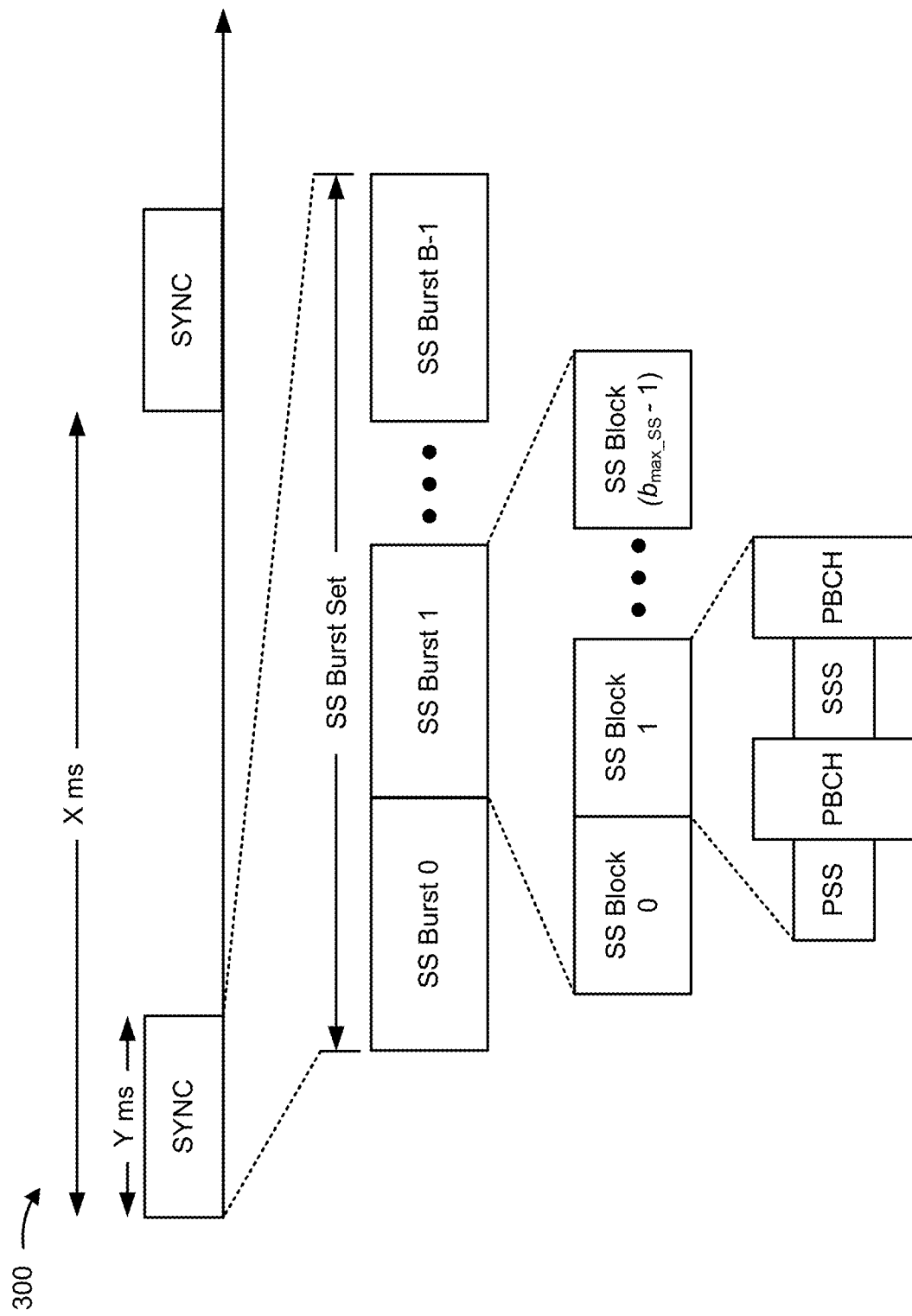
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}-1$), where $b_{max\_SS}-1$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
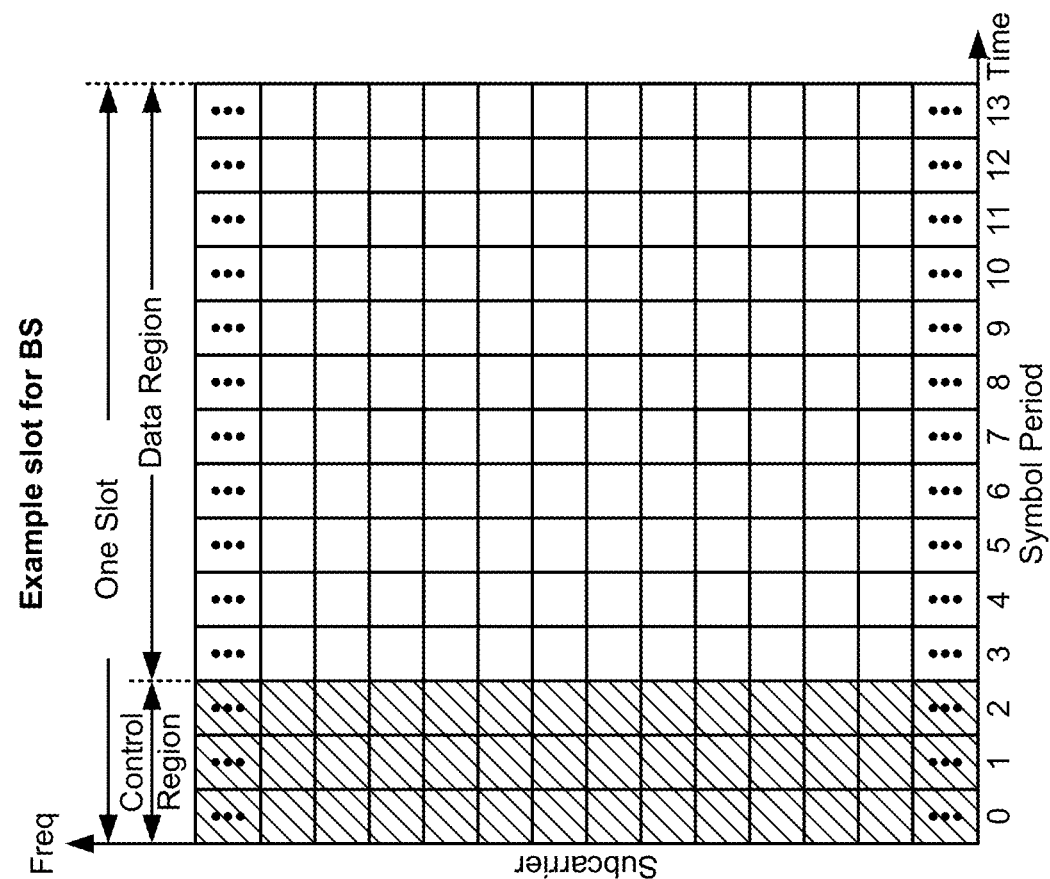
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra-reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 ms duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what is described with regard to FIG. 4.

Figure 5:
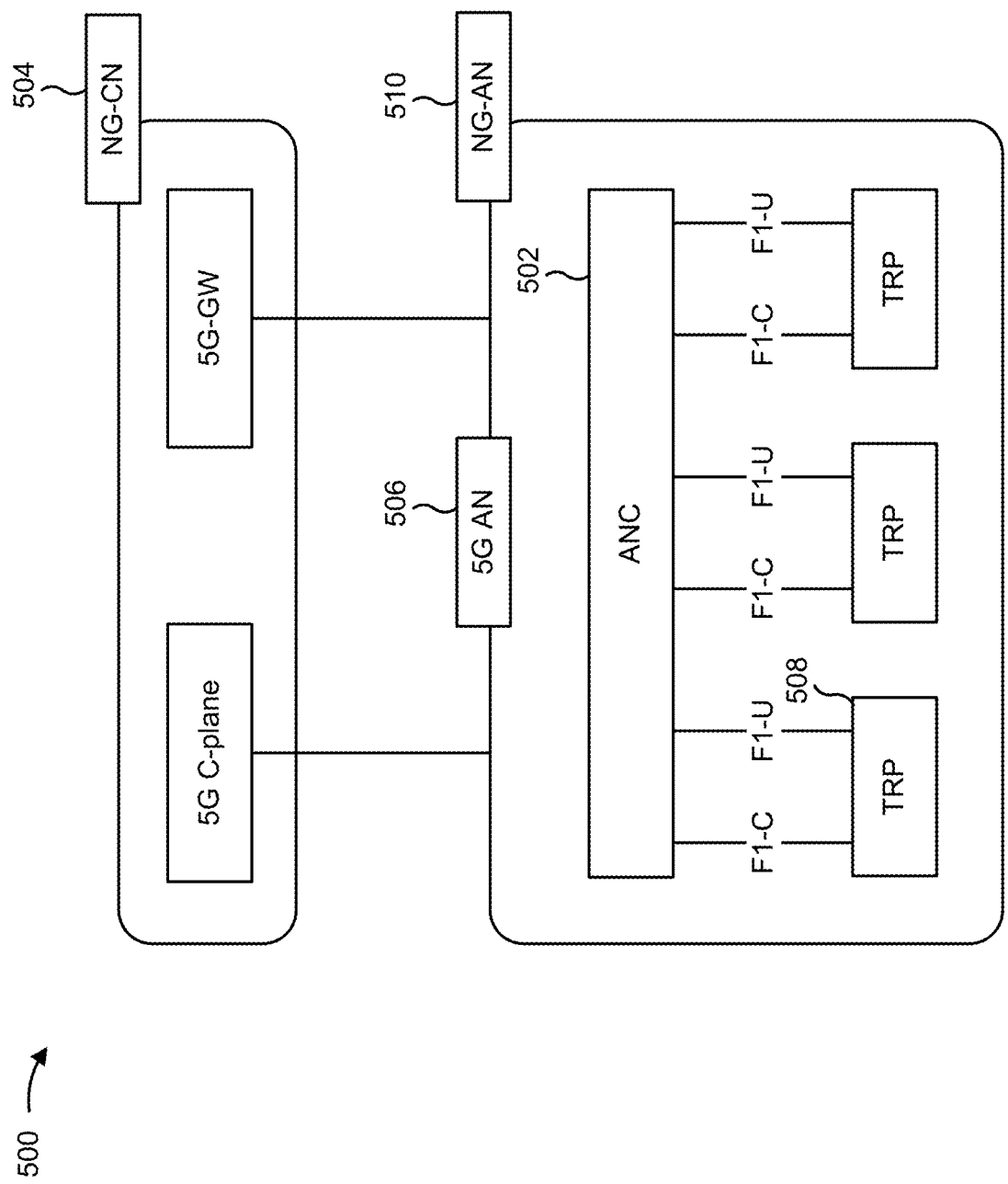
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples may differ from what is described with regard to FIG. 5.

Figure 6:
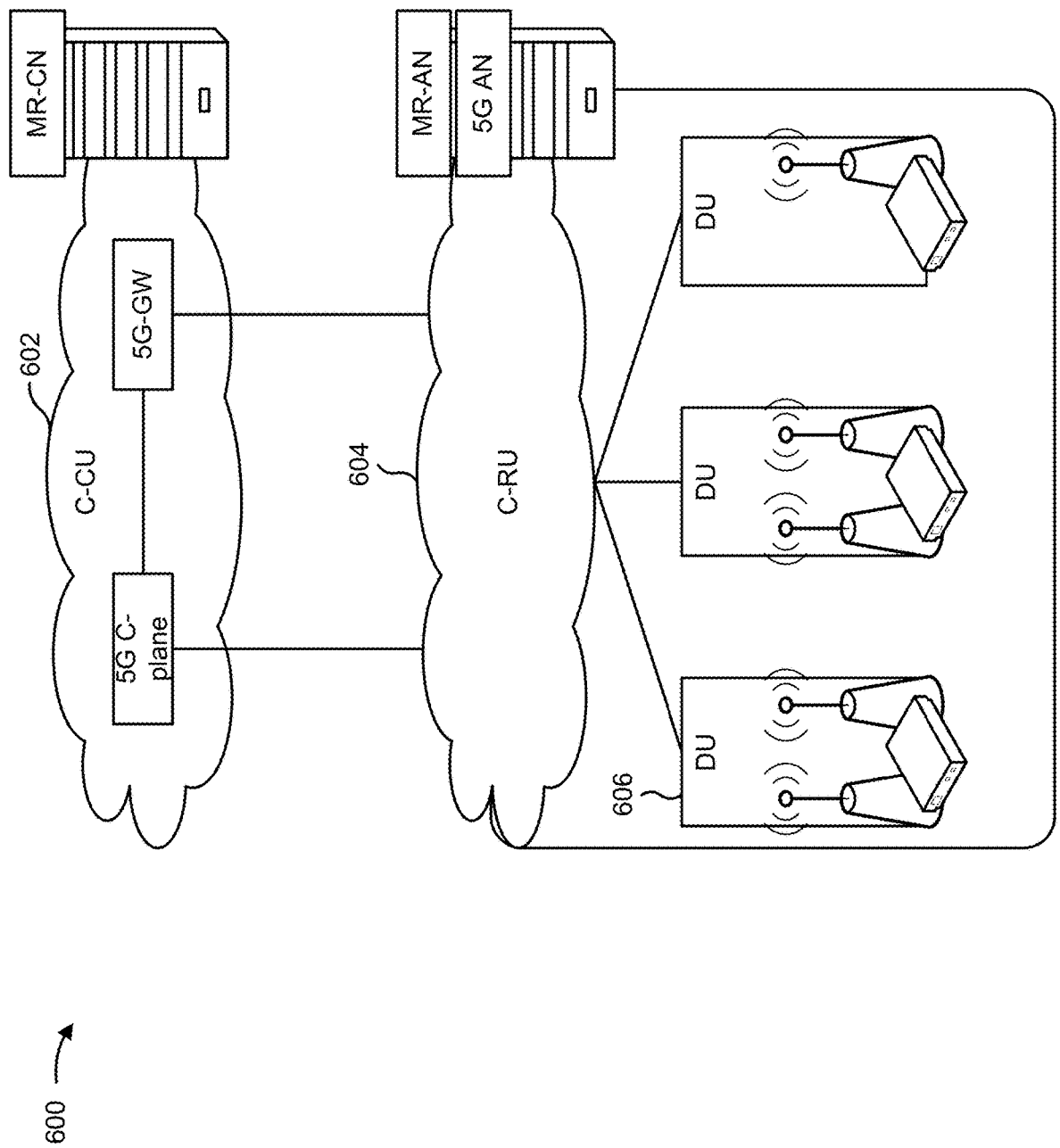
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples may differ from what is described with regard to FIG. 6.

In some communication systems, such as 5G or NR, a plurality of different quasi co-location (QCL) relations may be defined for receiving a signal from a BS. For example, QCL relation type A may define a doppler shift, a doppler spread, an average delay, a delay spread, and/or the like for a UE to receive a signal from a BS. Similarly, for QCL relation type B, a doppler shift and doppler spread may be defined; for QCL relation type C, a doppler shift and average delay may be defined; and for QCL type D, a spatial receiver parameter may be defined. In another example, another type of QCL relation may define an average delay and a delay spread for receiving a signal. In some cases, a transmission configuration indicator (TCI) state of a signal may be optionally definable, which may result in a BS failing to transmit information identifying a QCL relation to use for receiving the signal. As a result, a UE may be unable to receive and process the signal, which may result in the UE dropping the signal and in degraded network performance.

Some aspects described herein may use information regarding whether a physical downlink shared channel (PDSCH) is scheduled for a same set of symbols as an occasion of a periodic channel state information reference signal (P-CSI-RS) to determine a QCL relation for receiving and processing an occasion of the P-CSI-RS. For example, when a UE receives a grant scheduling the PDSCH for the same set of symbols as a scheduled occasion of a P-CSI-RS, the UE may determine a QCL relation for receiving the scheduled occasion of the P-CSI-RS based at least in part on a corresponding QCL relation of the PDSCH. Alternatively, when a PDSCH is not scheduled for the same set of symbols as the scheduled occasion of the P-CSI-RS, the UE may determine the QCL relation based at least in part on one or more QCL relations of one or more control-resource sets (CORESETs) received by the UE. In this way, the UE may receive and process a P-CSI-RS when information scheduling the P-CSI-RS does not include information identifying a QCL relation, thereby reducing a likelihood of dropped signals and improving network performance.

Figure 7A:
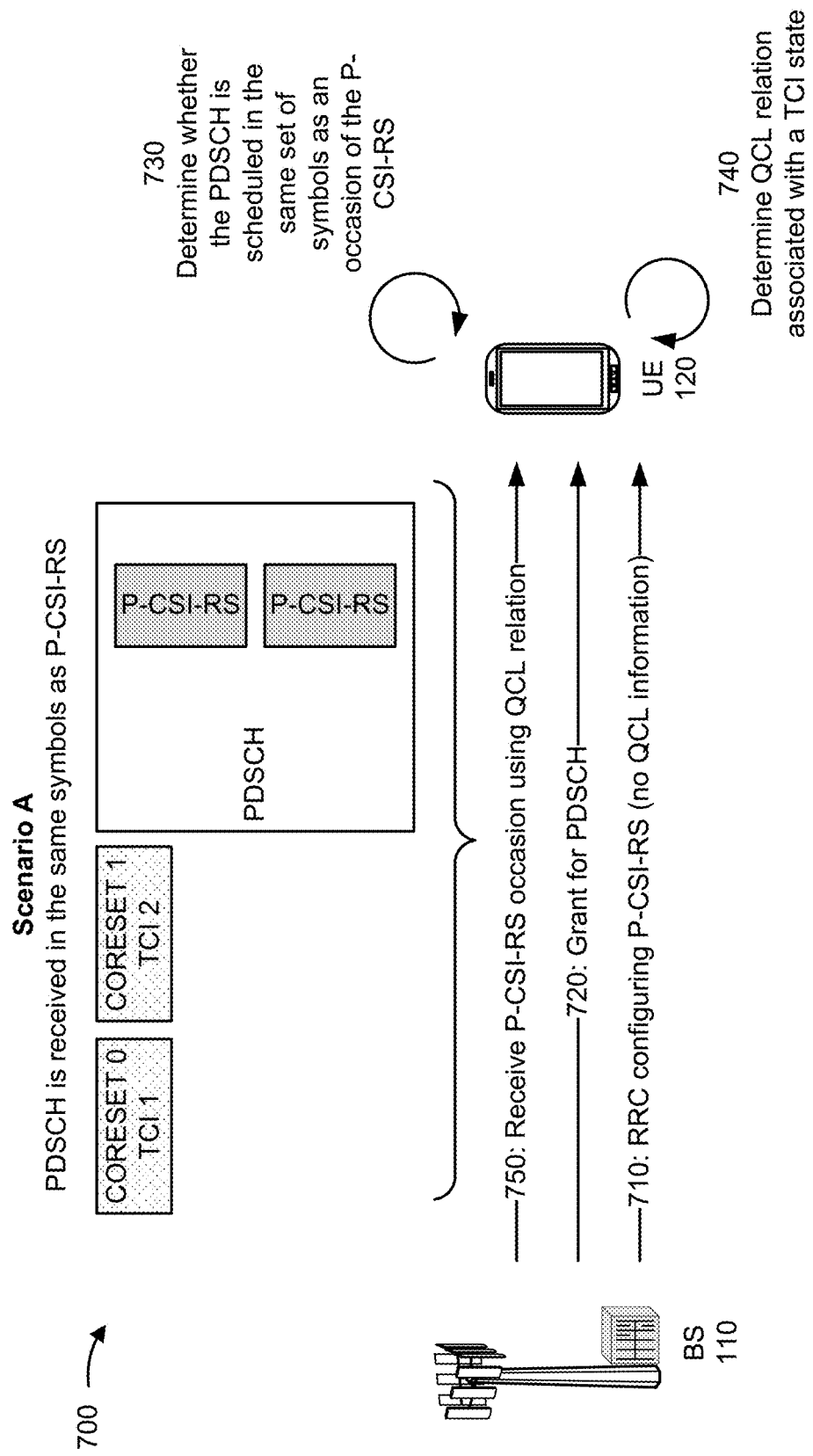
FIGS. 7A-7C are diagrams illustrating examples of QCL relation configuration for P-CSI-RSs, in accordance with various aspects of the present disclosure.
Figure 7B:
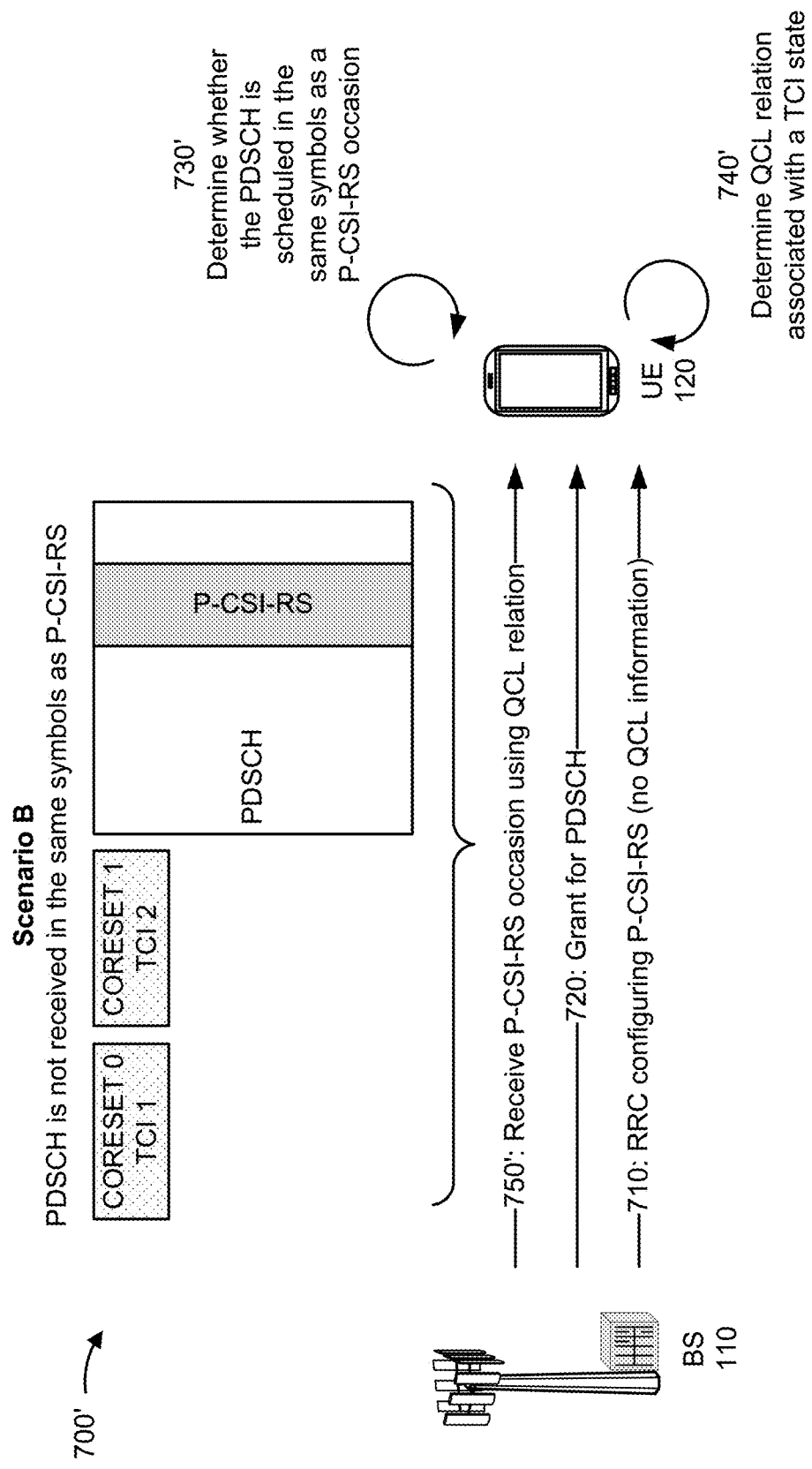
Figure 7C:
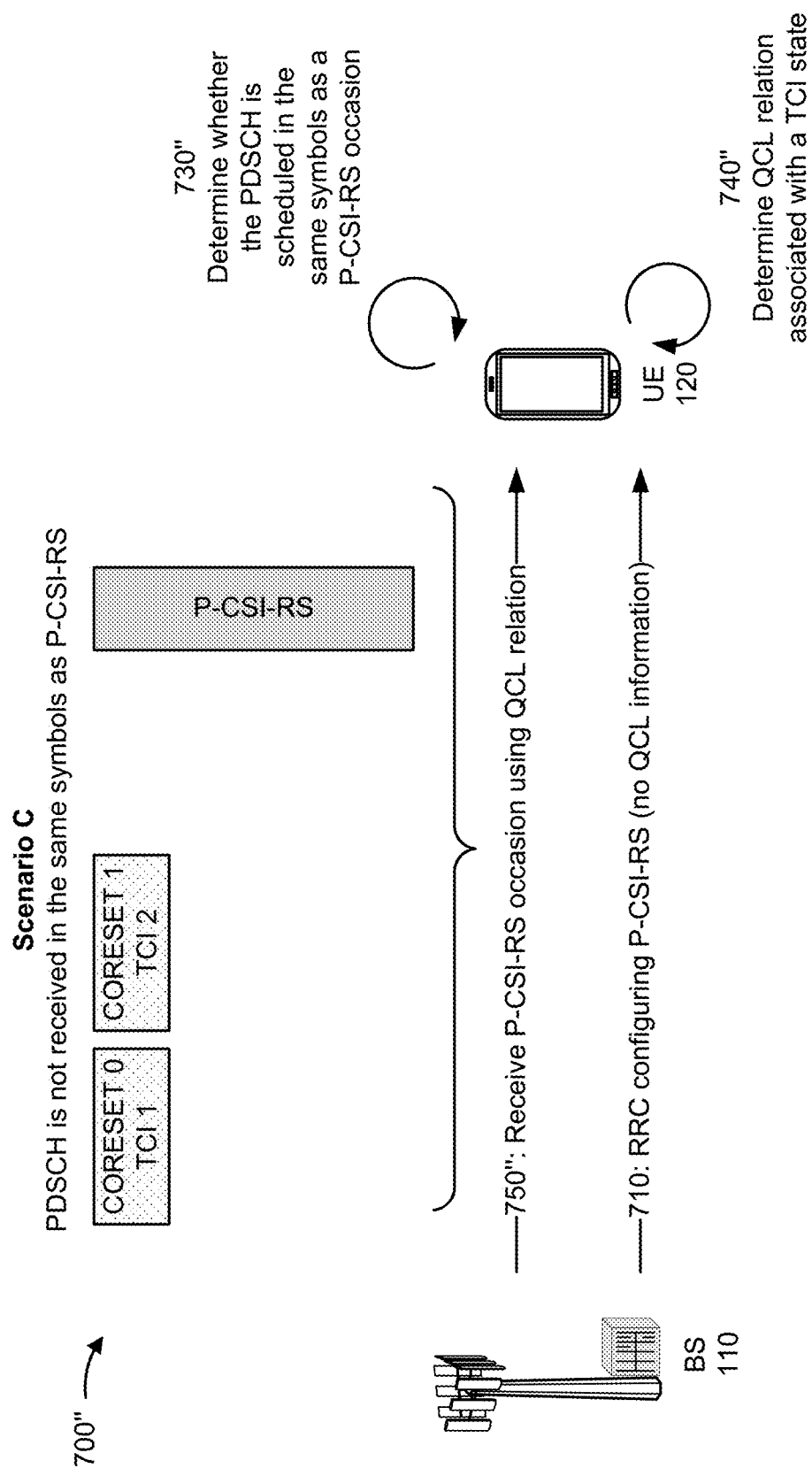

FIGS. 7A-7C are diagrams illustrating examples 700/700'/700" of QCL relation configuration for P-CSI-RSs, in accordance with various aspects of the present disclosure. As shown in FIG. 7A, example 700 may include a BS 110 and a UE 120.

As further shown in FIG. 7A, and by reference number 710, UE 120 may receive an radio resource control (RRC) message configuring one or more occasions of a P-CSI-RS with no QCL information. For example, UE 120 may receive, from BS 110, information configuring one or more occasions of the P-CSI-RS that does contain information identifying a QCL relation to use to receive the one or more occasions of the P-CSI-RS. In some aspects, UE 120 may receive information identifying a QCL relation for other occasions of the P-CSI-RS or another P-CSI-RS. For example, BS 110 may provide configuration information that does not identify a first QCL relation for first occasions of a first P-CSI-RS but does identify a second QCL relation for second occasions of a second P-CSI-RS.

In some aspects, UE 120 may transmit UE capability information before receiving the RRC message. For example, UE 120 may transmit information indicating whether UE 120 is capable of receiving RRC information configuring some P-CSI-RS occasions with QCL relation information and some P-CSI-RS occasions without QCL relation information. Additionally, or alternatively, UE 120 may transmit information indicating whether UE 120 is capable of being configured without an RRC-based configuration of a QCL for a P-CSI-RS associated with a report with a time restriction is off, whether a history of previous TCI states of previous P-CSI-RS is to be transmitted to UE 120, and/or the like as described in more detail below.

As further shown in FIG. 7A, and by reference number 720, UE 120 may receive a grant for a PDSCH. For example, as shown in scenario A, UE 120 may receive a grant scheduling the PDSCH for a same set of symbols as an occasion (or two occasions, as shown, or another quantity of occasions) of the P-CSI-RS. In contrast, as shown in FIG. 7B, and in scenario B, UE 120 may receive a grant scheduling the PDSCH for different symbols than an occasion of the P-CSI-RS. In contrast, as shown in FIG. 7C, UE 120 may not receive a grant scheduling the PDSCH resulting in, as shown by scenario C, a PDSCH not being scheduled for the same set of symbols as an occasion of the P-CSI-RS.

As further shown in FIG. 7A, and by reference number 730, UE 120 may determine whether the PDSCH is scheduled in the same set of symbols as an occasion of the P-CSI-RS. For example, as shown in scenario A, based at least in part on the grant, UE 120 may determine that a PDSCH is scheduled for the same set of symbols as an occasion of the P-CSI-RS. In contrast, as shown in scenario B and by reference number 730' and C and by reference number 730", in FIGS. 7B and 7C, respectively, UE 120 may determine that a PDSCH is not scheduled for the same set of symbols as an occasion of the P-CSI-RS. In some aspects, UE 120 may determine whether an occasion of the P-CSI-RS is to occur in a same set of symbols as a PDSCH based at least in part on respective scheduling information of the RRC message and the grant. In some aspects, UE 120 may determine whether an occasion of the P-CSI-RS is to occur in a same set of symbols as a PDSCH based at least in part on detecting the PDSCH at a time when UE 120 is to receive the occasion of the P-CSI-RS.

In some aspects, UE 120 may determine whether the PDSCH is scheduled in the same set of symbols as an occasion of the P-CSI-RS based at least in part on a scheduling constraint. For example, UE 120 may determine that either all of the symbols of the occasion of the P-CSI-RS overlap with the PDSCH or none of the symbols of the occasion of the P-CSI-RS overlap with the PDSCH. In some aspects, based at least in part on determining that even a single symbol of the occasion of the P-CSI-RS overlaps with the PDSCH, UE 120 may determine that the PDSCH is scheduled in the same set of symbols as the occasion of the P-CSI-RS. In some aspects, based at least in part on determining that a threshold quantity of symbols of the occasion of the P-CSI-RS overlaps with the PDSCH, UE 120 may determine that the PDSCH is scheduled in the same set of symbols as the occasion of the P-CSI-RS. In some aspects, UE 120 may determine that an occasion of the P-CSI-RS does not overlap with the PDSCH unless the occasion of the P-CSI-RS and the PDSCH have a common TCI state. In this case, UE 120 determines a QCL relation of the PDSCH is useable for the occasion of the P-CSI-RS based at least in part on the common TCI state, as described in more detail herein.

As further shown in FIG. 7A, and by reference number 740, UE 120 may determine a QCL relation associated with a TCI state for the occasion of a P-CSI-RS. For example, based at least in part on determining that a PDSCH is scheduled for the same set of symbols as the occasion of the P-CSI-RS, UE 120 may determine the QCL relation for the occasion of the P-CSI-RS. In this case, UE 120 may determine the QCL relation based at least in part on a corresponding QCL relation of the PDSCH scheduled for the same set of symbols as the occasion of the P-CSI-RS. For example, UE 120 may determine QCL relation type A, type B, type C, type D, and/or the like. In this way, UE 120 enables reception and processing of the occasion of the P-CSI-RS.

Additionally, or alternatively, based at least in part on determining that a PDSCH is not scheduled for the same set of symbols as the occasion of the P-CSI-RS, as shown by reference numbers 740' and 740" in FIGS. 7B and 7C, respectively, UE 120 may determine the QCL relation for the occasion of the P-CSI-RS based at least in part on a QCL relation of a CORESET (e.g., CORESET 0, CORESET 1, and/or the like). For example, UE 120 may determine a QCL relation of a particular CORESET, and may use the QCL relation of the particular CORESET for receiving the occasion of the P-CSI-RS. In some aspects, UE 120 may select the particular CORESET based at least in part on one or more selection criteria. For example, UE 120 may select the particular CORESET based at least in part on whether the particular CORESET has a configured TCI state, whether the particular CORESET occurs in a latest slot of a set of CORESETs received by UE 120, whether a tracking reference signal is configured as a QCL relation source for the particular CORESET, and/or the like. Additionally, or alternatively, UE 120 may select the particular CORESET based at least in part on a CORESET identifier of the particular CORESET, a serving cell associated with the particular CORESET, whether a slot containing the occasion of the P-CSI-RS includes the particular CORESET, and/or the like.

In some aspects, UE 120 may select the particular CORESET from which to obtain a QCL relation based at least in part on a plurality of selection criteria. For example, UE 120 may select a CORESET with a lowest CORESET identifier or a highest CORESET identifier of CORESETs, which are in a latest slot for which one or more CORESETs are configured for the UE 120 within an active bandwidth part (BWP) of a serving cell of UE 120, having a configured TCI state. Additionally, or alternatively, UE 120 may select a CORESET with a lowest CORESET identifier or a highest CORESET identifier of CORESETs, which are configured for UE 120 within an active BWP of a serving cell of UE 120, having a configured TCI state.

Additionally, or alternatively, UE 120 may select a CORESET with a lowest CORESET identifier or a highest CORESET identifier of CORESETs, which are in a latest slot for which one or more CORESETs are configured for UE 120 within an active BWP of a serving cell of UE 120. Additionally, or alternatively, UE 120 may select a CORESET with a lowest CORESET identifier or a highest CORESET identifier of CORESETs that are configured for UE 120 within an active BWP of a serving cell of UE 120.

As further shown in FIGS. 7A, 7B, and 7C, and by reference numbers 750/750'/750", respectively, UE 120 may receive and process the occasion of the P-CSI-RS using the QCL relation determined for the occasion of the P-CSI-RS. For example, UE 120 may receive and process the occasion of the P-CSI-RS using a QCL relation of a PDSCH, a QCL relation of a CORESET, and/or the like. In some aspects, UE 120 may receive and process the occasion of the P-CSI-RS based at least in part on a scheduling constraint. For example, based at least in part on a constraint that a change of active TCI states using a media access control (MAC) control element (CE) not occur during symbols of the occasion of the P-CSI-RS (e.g., multi-symbol occasion orthogonal frequency division multiplexing (OFDM) symbol occasion with time domain orthogonal cover code (TD-OCC), such as a 2 OFDM symbol occasion or a 4 OFDM symbol occasion), UE 120 may receive the occasion of the P-CSI-RS using the QCL relation of a PDSCH.

In some aspects, UE 120 may perform P-CSI-RS averaging to process the P-CSI-RS. For example, UE 120 may average occasions of P-CSI-RSs using a common TCI state for channel quality information (CQI) determination, rank indicator (RI) determination, precoding matrix indicator (PMI) determination, layer 1 reference signal received power (L1-RSRP) determination, and/or the like. In some aspects, UE 120 may receive information from BS 110 to enable processing of the occasion P-CSI-RS. For example, for a UE 120 with a time measurement restriction set to off, UE 120 may receive information identifying TCI states associated with previous transmissions of P-CSI-RS occasions, which may enable UE 120 to determine which P-CSI-RS occasions to average with the occasion of the P-CSI-RS to perform a channel determination (e.g., a CQI determination). In this way, UE 120 may process the occasion of the P-CSI-RS even if one or more previous grants were lost.

As indicated above, FIGS. 7A-7C are provided as examples. Other examples may differ from what is described with respect to FIGS. 7A-7C.

Figure 8:
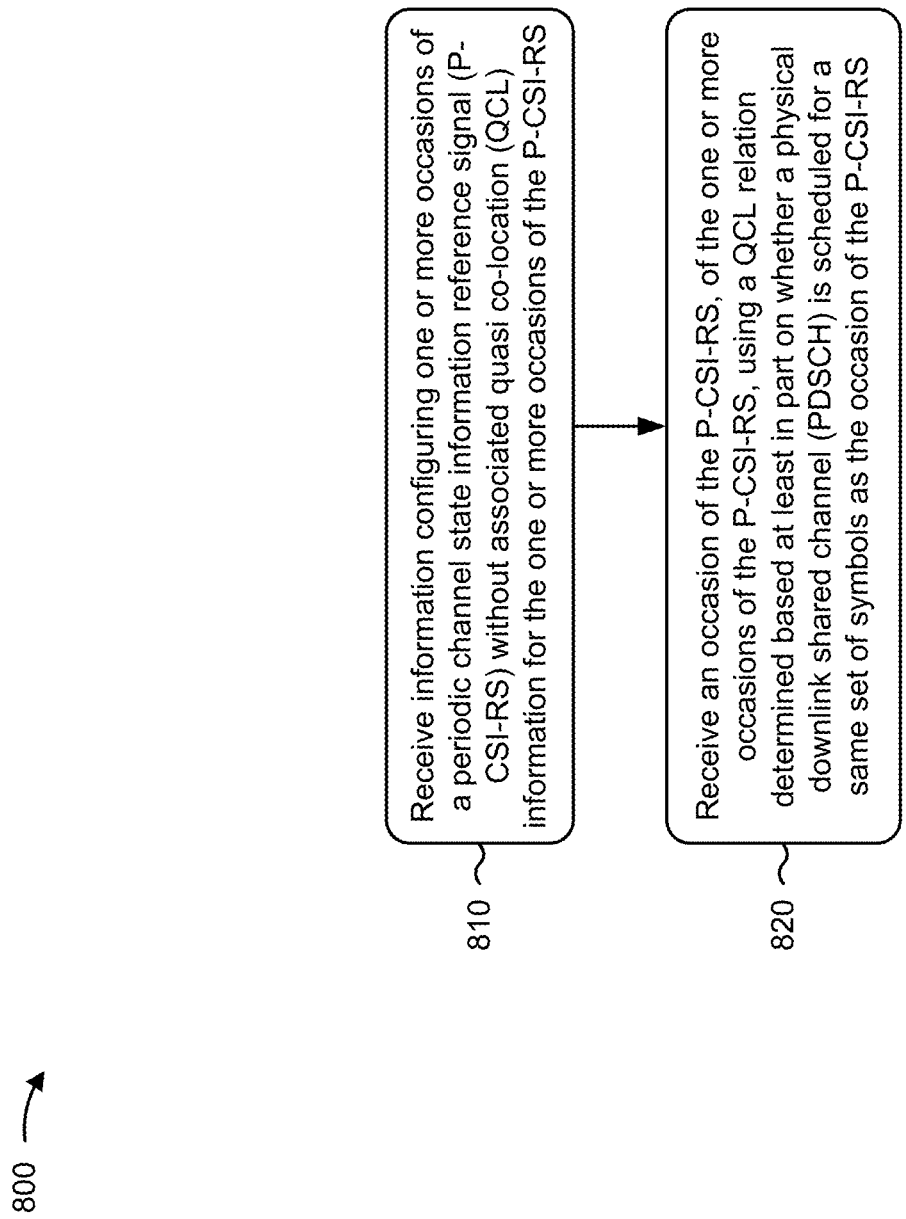
FIG. 8 is a diagram illustrating an example process performed, for example, by a user equipment, in accordance with various aspects of the present disclosure.

FIG. 8 is a diagram illustrating an example process 800 performed, for example, by a UE, in accordance with various aspects of the present disclosure. Example process 800 is an example where a UE (e.g., UE 120) performs QCL relation configuration or P-CSI-RS.

As shown in FIG. 8, in some aspects, process 800 may include receiving information configuring one or more occasions of a periodic channel state information reference signal (P-CSI-RS) without associated quasi co-location (QCL) information for the one or more occasions of the P-CSI-RS (block 810). For example, the UE (e.g., using antenna 252, DEMOD 254, MIMO detector 256, receive processor 258, controller/processor 280, and/or the like) may receive information configuring one or more occasions of a periodic channel state information reference signal (P-CSI-RS) without associated quasi co-location (QCL) information for the one or more occasions of the P-CSI-RS, as described in more detail above with regard to FIGS. 7A-7C. In other words, the information received by the UE configuring the one or more occasions of a P-CSI-RS may not include explicit QCL information associated with the one or more occasions of the P-CSI-RS but may enable implicit determination of the QCL relation for the one or more occasions of the P-CSI-RS. Additionally or alternatively, the UE may not receive explicit QCL information. As such, the UE may use a QCL relation based on an assumption (i.e., an implicit determination) and/or other information implying the QCL relation and/or QCL information.

As shown in FIG. 8, in some aspects, process 800 may include receiving an occasion of the P-CSI-RS, of the one or more occasions of the P-CSI-RS, using a QCL relation determined based at least in part on whether a physical downlink shared channel (PDSCH) is scheduled for a same set of symbols as the occasion of the P-CSI-RS (block 820). For example, the UE (e.g., using antenna 252, DEMOD 254, MIMO detector 256, receive processor 258, controller/processor 280, and/or the like) may receive an occasion of the P-CSI-RS, of the one or more occasions of the P-CSI-RS, using a QCL relation determined based at least in part on whether a physical downlink shared channel (PDSCH) is scheduled for a same set of symbols as the occasion of the P-CSI-RS, as described in more detail above with regard to FIGS. 7A-7C.

Process 800 may include additional aspects, such as any single aspect and/or any combination of aspects described below and/or in connection with one or more other processes described elsewhere herein.

In a first aspect, the UE may determine the QCL relation based at least in part on whether a grant is received scheduling the PDSCH for the same set of symbols with the occasion of the P-CSI-RS. In a second aspect, alone or in combination with the first aspect, the UE may determine the QCL relation based at least in part on whether the PDSCH is scheduled for the same set of symbols as the occasion of the P-CSI-RS. In a third aspect, alone or in combination with one or more of the first and second aspects, the PDSCH is scheduled for the same set of symbols as the occasion of the P-CSI-RS, and the UE may determine the QCL relation based at least in part on a corresponding QCL relation of the PDSCH.

In a fourth aspect, alone or in combination with one or more of the first through third aspects, the PDSCH is not scheduled for the same set of symbols as the occasion of the P-CSI-RS, and the UE may determine the QCL relation based at least in part on a corresponding QCL relation of a particular control-resource set (CORESET). In a fifth aspect, alone or in combination with one or more of the first through fourth aspects, the particular CORESET is selected based at least in part on at least one of a CORESET identifier of the particular CORESET, whether a transmission configuration indicator (TCI) state is configured for the particular CORESET, a bandwidth part associated with the particular CORESET, a serving cell associated with the particular CORESET, whether a tracking reference signal or a channel state information reference signal (CSI-RS) for tracking is configured as a QCL source for the particular CORESET, or whether a slot containing the occasion of the P-CSI-RS includes the particular CORESET. In a sixth aspect, alone or in combination with one or more of the first through fifth aspects, the particular CORESET is selected based at least in part on having a lowest CORESET identifier or a highest CORESET identifier of CORESETs, the CORESETs being in a latest slot for which one or more CORESETs are configured for the UE within an active bandwidth part (BWP) of a serving cell of the UE, the selected particular CORESET with the lowest or highest CORESET identifier having a configured transmission configuration indicator (TCI) state. In other words, the selected particular CORESET with the lowest or highest CORESET identifier may be selected from a set of CORESETs having a configured TCI state, where the set of CORESETs having a configured TCI state is a subset of a plurality of configured CORESETs appearing in the latest slot for which one or more CORESETs are configured for the UE within an active BWP of a serving cell of the UE.

In a seventh aspect, alone or in combination with one or more of the first through sixth aspects, the particular CORESET is selected based at least in part on having a lowest CORESET identifier or a highest CORESET identifier of CORESETs, the CORESETs being configured for the UE within an active bandwidth part (BWP) of a serving cell of the UE, the selected particular CORESET with the lowest or highest CORESET identifier having a configured transmission configuration indicator (TCI) state. In other words, the selected particular CORESET with the lowest or highest CORESET identifier may be selected from a set of CORESETs/s having a configured TCI state, where the set of CORESETs having a configured TCI state is a subset of a plurality of configured CORESETs configured for the UE within an active BWP of a serving cell of the UE. In an eighth aspect, alone or in combination with one or more of the first through seventh aspects, the particular CORESET is selected based at least in part on having a lowest CORESET identifier or a highest CORESET identifier of CORESETs, the CORESETs being in a latest slot for which one or more CORESETs are configured for the UE within an active bandwidth part (BWP) of a serving cell of the UE. In other words, the selected particular CORESET with the lowest or highest CORESET identifier may be selected from a plurality of configured CORESETs appearing in the latest slot for which one or more CORESETs are configured for the UE within an active BWP of a serving cell of the UE. In a ninth aspect, alone or in combination with one or more of the first through eighth aspects, the UE is configured with more than one active transmission configuration indicator (TCI) state.

In a tenth aspect, alone or in combination with one or more of the first through ninth aspects, the particular CORESET is selected based at least in part on having a lowest CORESET identifier or a highest CORESET identifier of CORESETs that are configured for the UE within an active bandwidth part (BWP) of a serving cell of the UE. In an eleventh aspect, alone or in combination with one or more of the first through tenth aspects, all symbols of the occasion of the P-CSI-RS overlap with the PDSCH or no symbols of the occasion of the P-CSI-RS overlap with the PDSCH. In a twelfth aspect, alone or in combination with one or more of the first through eleventh aspects, the PDSCH is received using the same set of symbols as the P-CSI-RS when the PDSCH and the occasion of the P-CSI-RS have a same active TCI state.

In a thirteenth aspect, alone or in combination with one or more of the first through twelfth aspects, the information configuring the one or more occasions of the P-CSI-RS includes information identifying another QCL relation for one or more other occasions of the P-CSI-RS. In a fourteenth aspect, alone or in combination with one or more of the first through thirteenth aspects, the one or more occasions of the P-CSI-RS are associated with a channel state information (CSI) report with a time-measurement restriction. In a fifteenth aspect, alone or in combination with one or more of the first through fourteenth aspects, the one or more occasions of the P-CSI-RS are associated with a channel state information (CSI) report without a time-measurement restriction, and the UE is to receive information identifying QCL relations configured for the one or more occasions of the P-CSI-RS before the occasion of the P-CSI-RS.

In a sixteenth aspect, alone or in combination with one or more of the first through fifteenth aspects, the information identifying the QCL relation configured for the one or more occasions of the P-CSI-RS is received via a grant. In a seventeenth aspect, alone or in combination with one or more of the first through sixteenth aspects, the UE is to report, as a UE capability, whether a P-CSI-RS associated with a CSI report without time-measurement restriction is configurable without QCL relation identification information. In an eighteenth aspect, alone or in combination with one or more of the first through seventeenth aspects, no change of active TCI states based at least in part on a media access control (MAC) control element (CE) reconfiguration message is happening during the symbols occupied by the occasion of the P-CSI-RS, and the occasion of the P-CSI-RS is a multi-symbol with time domain orthogonal cover code (TD-OCC) occasion of the P-CSI-RS.

In a nineteenth aspect, alone or in combination with one or more of the first through eighteenth aspects, the UE is configured to receive, from a base station (BS), information identifying one or more control-resource set (CORESET) identifiers associated with occasions of the P-CSI-RS received before the occasion of the P-CSI-RS, and the UE is configured to determine the QCL relation based at least in part on the information identifying the one or more CORESET identifiers. In a twentieth aspect, alone or in combination with one or more of the first through nineteenth aspects, the UE is configured to transmit UE capability information to identify one or more QCL relation derivation options. In a twenty-first aspect, alone or in combination with one or more of the first through twentieth aspects, the UE is configured with a P-CSI-RS resource set containing a plurality of CSI-RS resources, whose QCL relation is either configured for all of the plurality of CSI-RS resources or not for any of the plurality of CSI-RS resources.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Satisfying a threshold may, depending on the context, refer to a value being greater than the threshold, greater than or equal to the threshold, less than the threshold, less than or equal to the threshold, equal to the threshold, not equal to the threshold, and/or the like.

It should be apparent that systems and/or methods, described herein, may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    receiving information configuring one or more occasions of a periodic channel state information reference signal (P-CSI-RS) without associated quasi co-location (QCL) information for the one or more occasions of the P-CSI-RS; and
    receiving an occasion of the P-CSI-RS, of the one or more occasions of the P-CSI-RS, using a QCL relation determined based at least in part on whether a physical downlink shared channel (PDSCH) is scheduled for a same set of symbols as the occasion of the P-CSI-RS.

2. The method of claim 1, further comprising:
    determining the QCL relation based at least in part on whether a grant is received scheduling the PDSCH for the same set of symbols with the occasion of the P-CSI-RS.

3. The method of claim 1, further comprising:
    determining the QCL relation based at least in part on whether the PDSCH is scheduled for the same set of symbols as the occasion of the P-CSI-RS.

4. The method of claim 3, wherein the PDSCH is scheduled for the same set of symbols as the occasion of the P-CSI-RS, and
    wherein determining the QCL relation comprises:
        determining the QCL relation based at least in part on a corresponding QCL relation of the PDSCH.

5. The method of claim 3, wherein the PDSCH is not scheduled for the same set of symbols as the occasion of the P-CSI-RS, and
    wherein determining the QCL relation comprises:
        determining the QCL relation based at least in part on a corresponding QCL relation of a particular control-resource set (CORESET).

6. The method of claim 5, wherein the particular CORESET is selected based at least in part on at least one of:
    a CORESET identifier of the particular CORESET,
    whether a transmission configuration indicator (TCI) state is configured for the particular CORESET,
    a bandwidth part associated with the particular CORESET,
    a serving cell associated with the particular CORESET,
    whether a tracking reference signal or a channel state information reference signal (CSI-RS) for tracking is configured as a QCL source for the particular CORESET, or
    whether a slot containing the occasion of the P-CSI-RS includes the particular CORESET.

7. The method of claim 5, wherein the particular CORESET is selected based at least in part on having a lowest CORESET identifier or a highest CORESET identifier of CORESETs, the CORESETs being in a latest slot for which one or more CORESETs are configured for the UE within an active bandwidth part (BWP) of a serving cell of the UE, the selected particular CORESET with the lowest or highest CORESET identifier having a configured transmission configuration indicator (TCI) state.

8. The method of claim 5, wherein the particular CORESET is selected based at least in part on having a lowest CORESET identifier or a highest CORESET identifier of CORESETs, the CORESETs being configured for the UE within an active bandwidth part (BWP) of a serving cell of the UE, the selected particular CORESET with the lowest or highest CORESET identifier having a configured transmission configuration indicator (TCI) state.

9. The method of claim 5, wherein the particular CORESET is selected based at least in part on having a lowest CORESET identifier or a highest CORESET identifier of CORESETs, the CORESETs being in a latest slot for which one or more CORESETs are configured for the UE within an active bandwidth part (BWP) of a serving cell of the UE.

10. The method of claim 5, wherein the particular CORESET is selected based at least in part on having a lowest CORESET identifier or a highest CORESET identifier of CORESETs that are configured for the UE within an active bandwidth part (BWP) of a serving cell of the UE.

11. The method of claim 1, wherein the UE is configured with more than one active transmission configuration indicator (TCI) state.

12. The method of claim 1, wherein all symbols of the occasion of the P-CSI-RS overlap with the PDSCH or no symbols of the occasion of the P-CSI-RS overlap with the PDSCH.

13. The method of claim 1, wherein the PDSCH is received using the same set of symbols as the P-CSI-RS when the PDSCH and the occasion of the P-CSI-RS have a same active TCI state.

14. The method of claim 1, wherein the information configuring the one or more occasions of the P-CSI-RS includes information identifying another QCL relation for one or more other occasions of the P-CSI-RS.

15. The method of claim 1, wherein the one or more occasions of the P-CSI-RS are associated with a channel state information (CSI) report with a time-measurement restriction.

16. The method of claim 1, wherein the one or more occasions of the P-CSI-RS are associated with a channel state information (CSI) report without a time-measurement restriction, and
    wherein the UE is to receive information identifying QCL relations configured for the one or more occasions of the P-CSI-RS before the occasion of the P-CSI-RS.

17. The method of claim 16, wherein the information identifying the QCL relations is received via a grant.

18. The method of claim 16, wherein the UE is to report, as a UE capability, whether a P-CSI-RS associated with a CSI report without time-measurement restriction is configurable without QCL relation identification information.

19. The method of claim 1, wherein no change of active TCI states based at least in part on a media access control (MAC) control element (CE) reconfiguration message is happening during the symbols occupied by the occasion of the P-CSI-RS, and wherein the occasion of the P-CSI-RS is a multi-symbol occasion with time domain orthogonal cover code (TD-OCC) of the P-CSI-RS.

20. The method of claim 1, wherein the UE is configured to receive, from a base station (BS), information identifying one or more control-resource set (CORESET) identifiers associated with occasions of the P-CSI-RS received before the occasion of the P-CSI-RS, and
wherein the UE is configured to determine the QCL relation based at least in part on the information identifying the one or more CORESET identifiers.

21. The method of claim 1, wherein the UE is configured to transmit UE capability information to identify one or more QCL relation derivation options.

22. The method of claim 1, wherein the UE is configured with a P-CSI-RS resource set containing a plurality of CSI-RS resources, whose QCL relation is either configured for all of the plurality of CSI-RS resources or not for any of the plurality of CSI-RS resources.

23. A user equipment (UE) for wireless communication, comprising:
a memory; and
one or more processors operatively coupled to the memory, the memory and the one or more processors configured to:
receive information configuring one or more occasions of a periodic channel state information reference signal (P-CSI-RS) without associated quasi co-location (QCL) information for the one or more occasions of the P-CSI-RS; and
receive an occasion of the P-CSI-RS, of the one or more occasions of the P-CSI-RS, using a QCL relation determined based at least in part on whether a physical downlink shared channel (PDSCH) is scheduled for a same set of symbols as the occasion of the P-CSI-RS.

24. The UE of claim 23, wherein the one or more processors are further configured to:
determine the QCL relation based at least in part on whether a grant is received scheduling the PDSCH for the same set of symbols with the occasion of the P-CSI-RS.

25. The UE of claim 23, wherein the one or more processors are further configured to:
determine the QCL relation based at least in part on whether the PDSCH is scheduled for the same set of symbols as the occasion of the P-CSI-RS.

26. A non-transitory computer-readable medium storing one or more instructions for wireless communication, the one or more instructions comprising:
one or more instructions that, when executed by one or more processors of a user equipment (UE), cause the one or more processors to:
receive information configuring one or more occasions of a periodic channel state information reference signal (P-CSI-RS) without associated quasi co-location (QCL) information for the one or more occasions of the P-CSI-RS; and
receive an occasion of the P-CSI-RS, of the one or more occasions of the P-CSI-RS, using a QCL relation determined based at least in part on whether a physical downlink shared channel (PDSCH) is scheduled for a same set of symbols as the occasion of the P-CSI-RS.

27. The non-transitory computer-readable medium of claim 26, wherein the one or more instructions, when executed by the one or more processors, further cause the one or more processors to:
determine the QCL relation based at least in part on whether a grant is received scheduling the PDSCH for the same set of symbols with the occasion of the P-CSI-RS.

28. The non-transitory computer-readable medium of claim 26, wherein the one or more instructions, when executed by the one or more processors, further cause the one or more processors to:
determine the QCL relation based at least in part on whether the PDSCH is scheduled for the same set of symbols as the occasion of the P-CSI-RS.

29. An apparatus for wireless communication, comprising:
means for receiving information configuring one or more occasions of a periodic channel state information reference signal (P-CSI-RS) without associated quasi colocation (QCL) information for the one or more occasions of the P-CSI-RS; and
means for receiving an occasion of the P-CSI-RS, of the one or more occasions of the P-CSI-RS, using a QCL relation determined based at least in part on whether a physical downlink shared channel (PDSCH) is scheduled for a same set of symbols as the occasion of the P-CSI-RS.

30. The apparatus of claim 29, further comprising:
means for determining the QCL relation based at least in part on whether a grant is received scheduling the PDSCH for the same set of symbols with the occasion of the P-CSI-RS.

* * * * *